(12) United States Patent
Yu et al.

(10) Patent No.: US 8,414,003 B2
(45) Date of Patent: Apr. 9, 2013

(54) VEHICULAR L-TYPE SUSPENSION ARM

(75) Inventors: Xiao Yu, Troy, OH (US); Bing Liu, Troy, OH (US); Hiroyuki Watanabe, Troy, OH (US); Katsumi Nagahori, Tochigi (JP); Mitsuru Inoue, Tochigi (JP)

(73) Assignee: F. Tech Incorporation, Saitama (JP)

( * ) Notice: Subject to any disclaimer, the term of this patent is extended or adjusted under 35 U.S.C. 154(b) by 0 days.

(21) Appl. No.: 13/127,691

(22) PCT Filed: Nov. 4, 2009

(86) PCT No.: PCT/JP2009/068809
§ 371 (c)(1),
(2), (4) Date: Aug. 16, 2011

(87) PCT Pub. No.: WO2010/053083
PCT Pub. Date: May 14, 2010

(65) Prior Publication Data
US 2011/0298192 A1 Dec. 8, 2011

(30) Foreign Application Priority Data
Nov. 5, 2008 (JP) ................................. 2008-284788

(51) Int. Cl.
*B60G 3/04* (2006.01)
*B21D 53/88* (2006.01)

(52) U.S. Cl.
USPC .................................. 280/124.134; 29/897.2

(58) Field of Classification Search ........... 280/124.121, 280/124.125, 124.134, 124.135, 124.138, 280/124.143, 124.15, 124.153; 29/897.2
See application file for complete search history.

(56) References Cited

U.S. PATENT DOCUMENTS

| 4,473,241 A | * | 9/1984 | von der Ohe et al. ......... 280/781 |
| 4,570,968 A | | 2/1986 | Mukai et al. |
| 4,986,566 A | * | 1/1991 | Nishino et al. ......... 280/124.145 |

(Continued)

FOREIGN PATENT DOCUMENTS

| CN | 1364670 A | 8/2002 |
| DE | 195 26 562 C2 | 2/1996 |

(Continued)

OTHER PUBLICATIONS

Chinese Office Action issued Dec. 28, 2012, in counterpart Chinese Patent Application No. 200980153603.2 (5 pages).

*Primary Examiner* — Joseph Rocca
(74) *Attorney, Agent, or Firm* — Arent Fox LLP

(57) ABSTRACT

A vehicular L-type suspension arm is provided in which a wheel support part is provided on one end part of an arm main body, and a first vehicle body side linking portion and a second vehicle body side linking portion are provided in an intermediate part and on the other end part thereof respectively, wherein an arm main body (A) includes an upper half body (AU) that is formed so as to have an inverted U-shaped cross-section and a lower half body (AL) that is formed by press forming a plate material in a shape that blocks the lower open end of the upper half body (AU) and is welded by welds (w1) to inner faces of a pair of side wall parts 2 of the upper half body (AU), at the other end part of the arm main body (A) the lower half body (AL) extends lengthwise further outward than the upper half body (AU), an upwardly facing cylindrical bush support part (P2) is formed by burring integrally with the extended part (Ale) so that it is the second vehicle body side connecting portion (AF2), and an outer peripheral face, close to the intermediate part of the arm main body (A), of the bush support part (P2) is butt-welded to an outer end face of the upper half body (AU). Thus, the second vehicle body side connecting portion can be formed by a simple structure in which an extended part of a lower half body of the arm main body is merely subjected to burring.

4 Claims, 15 Drawing Sheets

U.S. PATENT DOCUMENTS

| | | | |
|---|---|---|---|
| 5,662,349 A * | 9/1997 | Hasshi et al. | 280/124.134 |
| 7,703,783 B2 * | 4/2010 | Miyawaki | 280/124.134 |
| 7,980,576 B2 * | 7/2011 | Inoue et al. | 280/124.121 |
| 2002/0005621 A1 | 1/2002 | Christophliemke et al. | |
| 2004/0135337 A1 * | 7/2004 | Alesso et al. | 280/124.134 |

FOREIGN PATENT DOCUMENTS

| | | |
|---|---|---|
| DE | 200 09 695 U1 | 9/2000 |
| DE | 10 2006 060 896 A1 | 6/2008 |
| EP | 1223058 B1 | 2/2007 |
| GB | 2291382 A | 1/1996 |
| JP | 59-102606 A | 6/1984 |
| JP | 3136346 B2 | 12/2000 |
| JP | 2003-19907 A | 1/2003 |
| JP | 2004-533952 A | 11/2004 |
| JP | 4038890 B2 | 1/2008 |

* cited by examiner

CONVENTIONAL
FIG.16
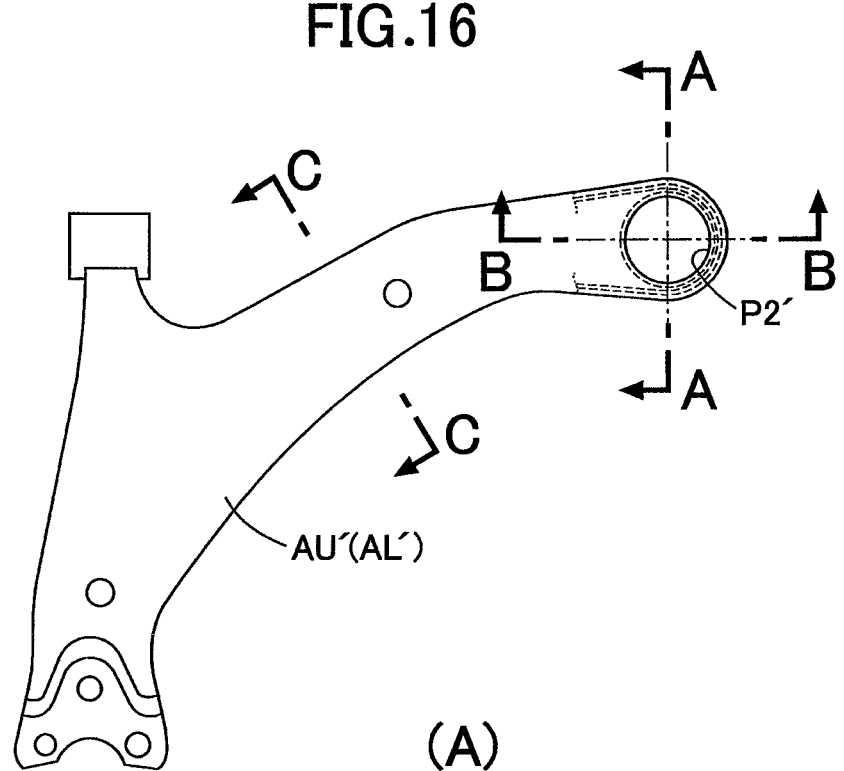
(A)
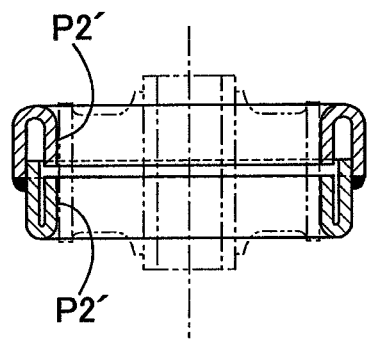
(C)  (B)
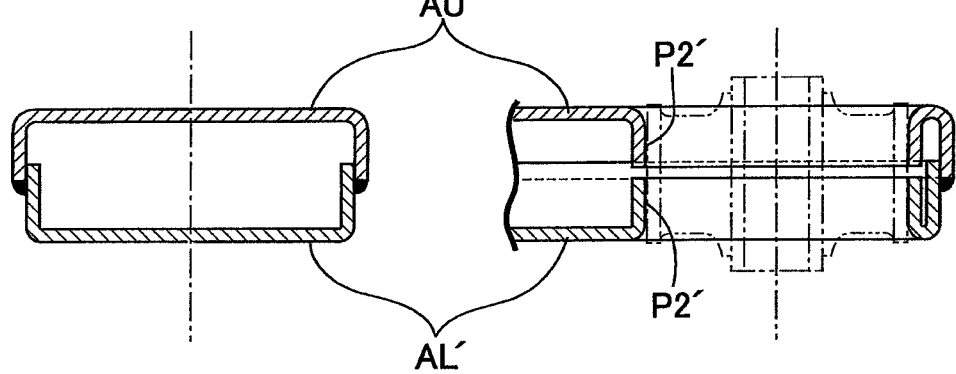

VEHICULAR L-TYPE SUSPENSION ARM

CROSS-REFERENCE TO RELATED APPLICATION

This application is a National Stage entry of International Application No. PCT/JP2009/068809, filed Nov. 4, 2009, which claims priority to Japanese Patent Application No. 2008-284788 filed Nov. 5, 2008, the disclosure of the prior applications are incorporated in its entirety by reference.

TECHNICAL FIELD

The present invention relates to a vehicular suspension arm and, in particular, an L-type suspension arm in which a wheel support part that is capable of supporting a wheel is provided on one end part of an arm main body that is L-shaped in plan view, a first vehicle body side linking portion that is capable of being swingably linked to a vehicle body via a first bush arranged with an axis thereof lying in a fore-and-aft direction of the vehicle body is provided in an intermediate part of the arm main body, and a second vehicle body side linking portion that can be swingably linked to the vehicle body via a second bush arranged with an axis thereof lying in an up-and-down direction is provided on the other end part of the arm main body.

BACKGROUND ART

The above-mentioned L-type suspension arm is widely used as a lower arm, etc. of an automobile, and a conventional structure is known in which, in order to reduce the weight of the suspension arm, the arm main body is formed from an upper half body and a lower half body, the upper half body and lower half body being formed by press forming of a plate material so as to have a U-shaped cross-section, and corresponding opposite side wall parts of the upper and lower half bodies are welded to each other in a state in which openings thereof face each other (ref. Patent Document 1 below).
Patent Document 1: Japanese Patent Application Laid-open No. 2003-19907

DISCLOSURE OF INVENTION

Problems to be Solved by the Invention

However, in the arrangement of Patent Document 1, the upper and lower half bodies are both formed by press forming a plate material, and in order to decrease the number of components of the arm main body and achieve light weight, as shown in FIG. 16 the upper and lower half bodies AU' and AL' are press formed so as to have a U-shaped cross-section, and short cylindrical bush-fitting support parts P2' and P2' are formed by burring integrally with extended parts at outer ends of the upper and lower half bodies to thus provide a second vehicle body side connecting portion. Because of this, it is necessary to greatly bend not only the upper half body AU' but also the lower half body AL' so as to have a U-shaped cross-section, it is also necessary to form by separately burring the pair of upper and lower bush-fitting support parts P2' and P2' in the extended parts at the outer ends of the upper and lower half bodies AU' and AL', and there are the problems that the overall processing cost increases, and the processing steps become complicated, thus degrading the work efficiency, etc.

The present invention has been accomplished in light of such circumstances, and it is an object thereof to provide a light weight and low cost vehicular L-type suspension arm that can solve the above-mentioned problems with the conventional structure by means of a simple structure.

Means for Solving the Problems

In order to attain the above object, according to a first aspect of the present invention, there is provided a vehicular L-type suspension arm in which a wheel support part that is capable of supporting a wheel is provided on one end part of an arm main body that is L-shaped in plan view, a first vehicle body side linking portion that is capable of being swingably linked to a vehicle body via a first bush arranged with an axis thereof lying in a fore-and-aft direction of the vehicle body is provided in an intermediate part of the arm main body, and a second vehicle body side linking portion that is capable of being swingably linked to the vehicle body via a second bush arranged with an axis thereof lying in an up-and-down direction is provided on the other end part of the arm main body, characterized in that the arm main body comprises an upper half body formed with an inverted U-shaped cross-section while having an upper wall part and a pair of side wall parts extending downward from opposite sides of the upper wall part, and a lower half body that is formed by press forming a plate material in a shape so as to block a lower open end of the upper half body and is welded by welds to inner faces of the pair of side wall parts of the upper half body, at the other end part of the arm main body the lower half body extends lengthwise further outward than the upper half body, an upwardly facing cylindrical bush support part is formed by burring integrally with the extended part so that the extended part is the second vehicle body side connecting portion, the bush support part being capable of fitting onto and supporting an outer tubular part of the second bush, and an outer peripheral face, close to the intermediate part of the arm main body, of the bush support part is butt-welded by a weld to an outer end face of the upper half body.

According to a second aspect of the present invention, in addition to the arrangement of the first aspect, the lower half body is formed in a flat plate shape, and end faces on opposite sides thereof are butt-welded by welds to the inner faces of the pair of side wall parts of the upper half body.

According to a third aspect of the present invention, in addition to the arrangement of the first or second aspect, an upper end part of the bush support part projects further upward than an upper face of an outer end part of the upper half body, and an outer peripheral face of the projecting part and the upper face of the outer end part of the upper half body are welded by a weld.

According to a fourth aspect of the present invention, in addition to the arrangement of the second aspect, a curved part is formed on the lower half body along the longitudinal direction of the lower half body when press forming the lower half body, the curved part providing a connection between an intermediate part in the width direction of the lower half body and end parts on opposite sides in the width direction that are at a higher position than the intermediate part.

Effects of the Invention

In accordance with the first aspect of the present invention, since at the end part of the arm main body of the L-type suspension arm the lower half body extends lengthwise further outward than the upper half body, and the upwardly facing cylindrical bush support part is formed by burring integrally with the extended part so that the extended part is the second vehicle body side connecting portion, the bush support part being capable of fitting onto and supporting an outer tubular part of the second bush, the second vehicle body side connecting portion, which bears a relatively small load compared with the first vehicle body side connecting portion, can be obtained by a simple structure in which the extended part of the lower half body is merely subjected to burring, thus making a large contribution to saving processing cost and improving work efficiency. Moreover, since the outer peripheral face, close to the intermediate part of the arm main body, of the bush support part thus burred is butt-welded to the outer end face of the upper half body, the upper half body and the bush support part that is integral with the lower half body are joined and integrated, thus sufficiently enhancing the rigidity with which the bush is supported by the bush support part (that is, the rigidity of linking to the vehicle body).

Furthermore, in accordance with the second aspect of the present invention in particular, since the lower half body is basically formed as a flat plate shape, and the end faces on opposite sides thereof are butt-welded to the inner faces of the pair of side wall parts of the upper half body, the pressing process of the main body part of the lower half body can be simplified as much as possible, and the process is possible with a progressive die, thus contributing to a further saving of processing cost and further improvement in the work efficiency.

Moreover, in accordance with the third aspect of the present invention in particular, since the upper end part of the burred bush support part projects upward from the upper face of the outer end part of the upper half body, and the outer peripheral face of the projecting part and the upper face of the outer end part of the upper half body are welded, it is possible to ensure a sufficient welding allowance between the outer peripheral face of the projecting part and the upper face of the outer end part of the upper half body, thus enhancing the weld strength.

Furthermore, in accordance with the fourth aspect of the present invention in particular, since the curved part, which provides a connection between the intermediate part in the width direction of the lower half body and opposite end parts in the width direction that are higher than the intermediate part, is formed on the lower half body along the longitudinal direction of the lower half body when press forming the lower half body, the end faces on opposite sides of the lower half body can be sufficiently spaced upward from the lower open end of the upper half body while ensuring a sufficient cross-sectional height for the arm main body, thereby ensuring a sufficient welding allowance between the end faces on opposite sides of the lower half body and the inner faces of the side wall parts of the upper half body and thus enhancing the weld strength.

BRIEF DESCRIPTION OF DRAWINGS

FIG. 16 is an explanatory schematic diagram of a suspension arm of a Conventional Example.

EXPLANATION OF REFERENCE NUMERALS AND SYMBOLS

A Arm main body
AF1 First vehicle body side connecting portion
AF2 Second vehicle body side connecting portion
AL Lower half body
Ale Extended part
AU Upper half body
AW Wheel support part
B1 First bush
B2 Second bush
F Vehicle body
LA Lower arm (L-type suspension arm)
P2 Second bush support part (bush support part)
w9 Weld
1 Upper wall part
2 Side wall part

BEST MODE FOR CARRYING OUT THE INVENTION

Modes for carrying out the present invention are specifically explained below by reference to embodiments of the present invention illustrated in the attached drawings.

In the attached drawings, FIG. 1 to FIG. 14 show one embodiment of the present invention.

Figure 1:
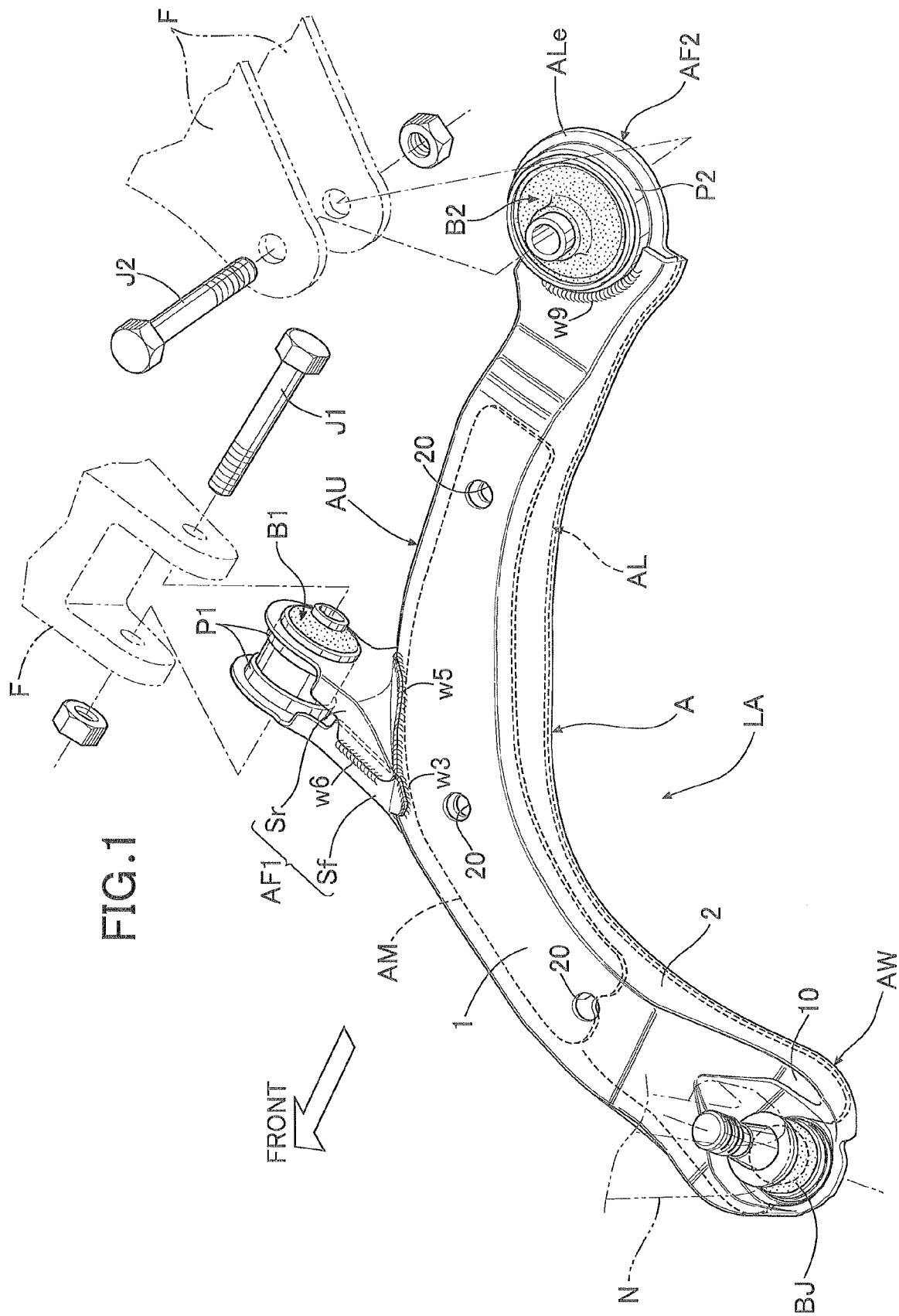
FIG. 1 is a simplified perspective view showing a mode of mounting an automobile suspension arm (L-type lower arm) related to one embodiment of the present invention on a vehicle.
Figure 2:
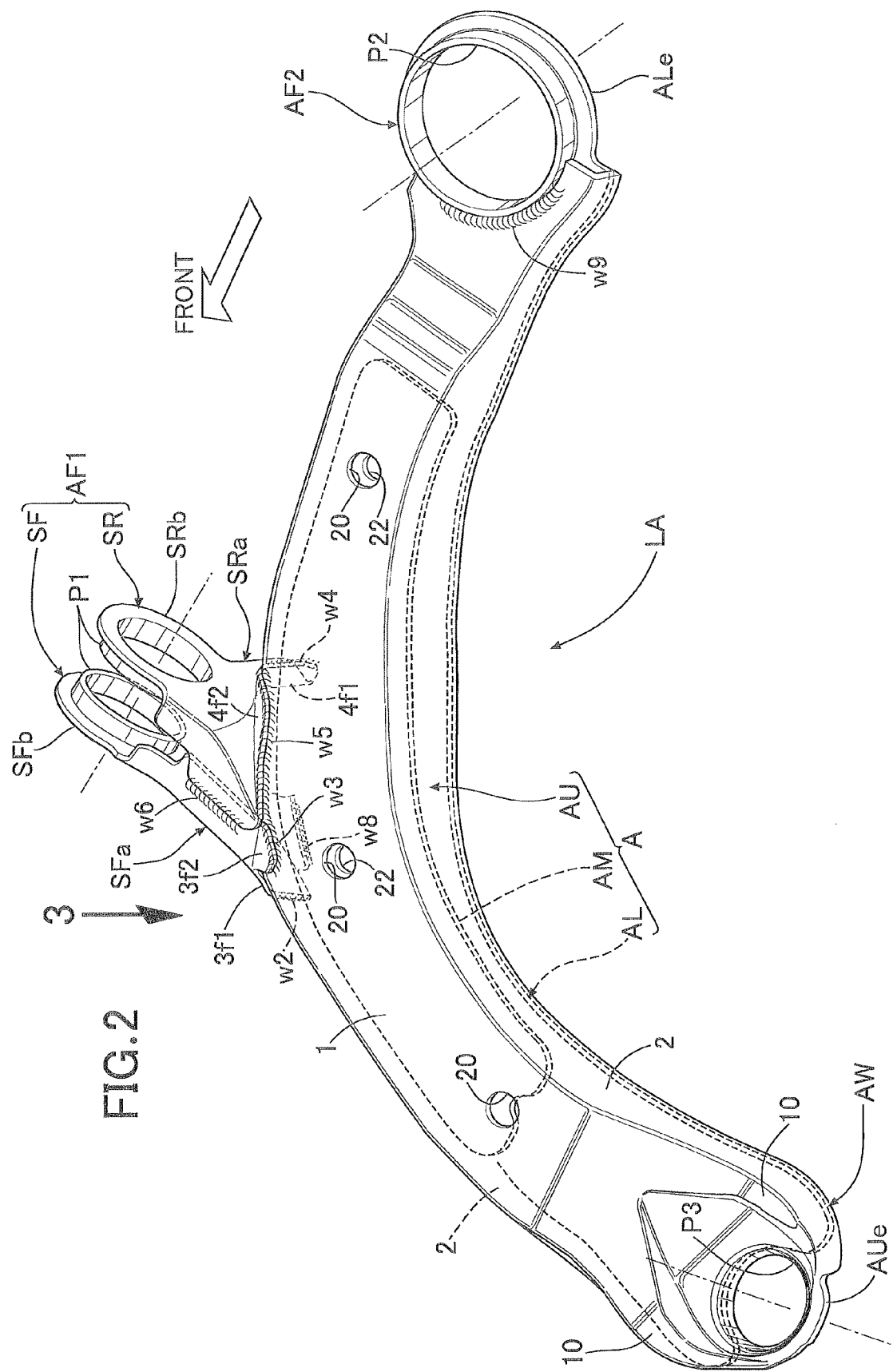
FIG. 2 is a perspective view of the suspension arm on its own.
Figure 3:
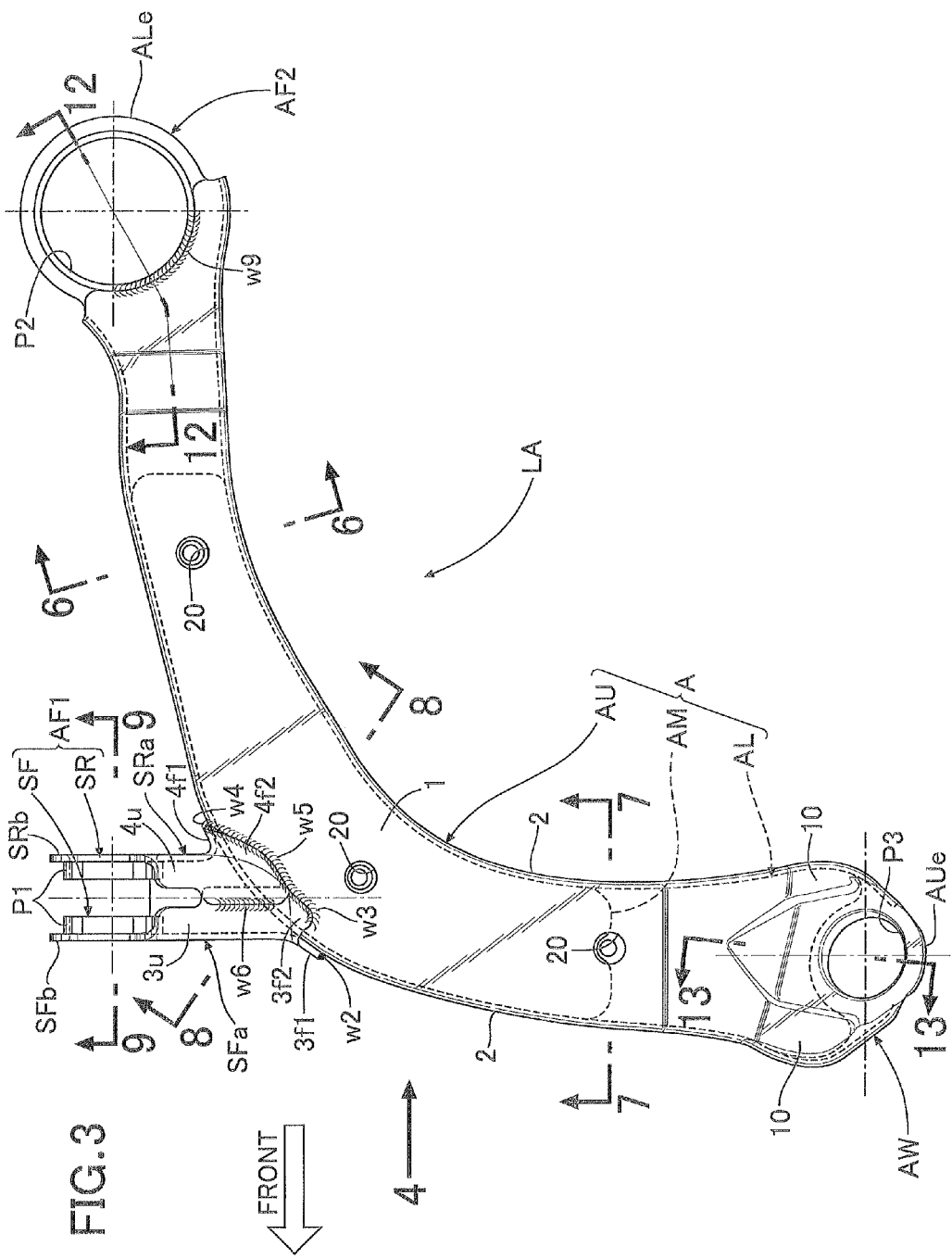
FIG. 3 is a plan view of the suspension arm on its own (view from arrow 3 in FIG. 2).
Figure 4:
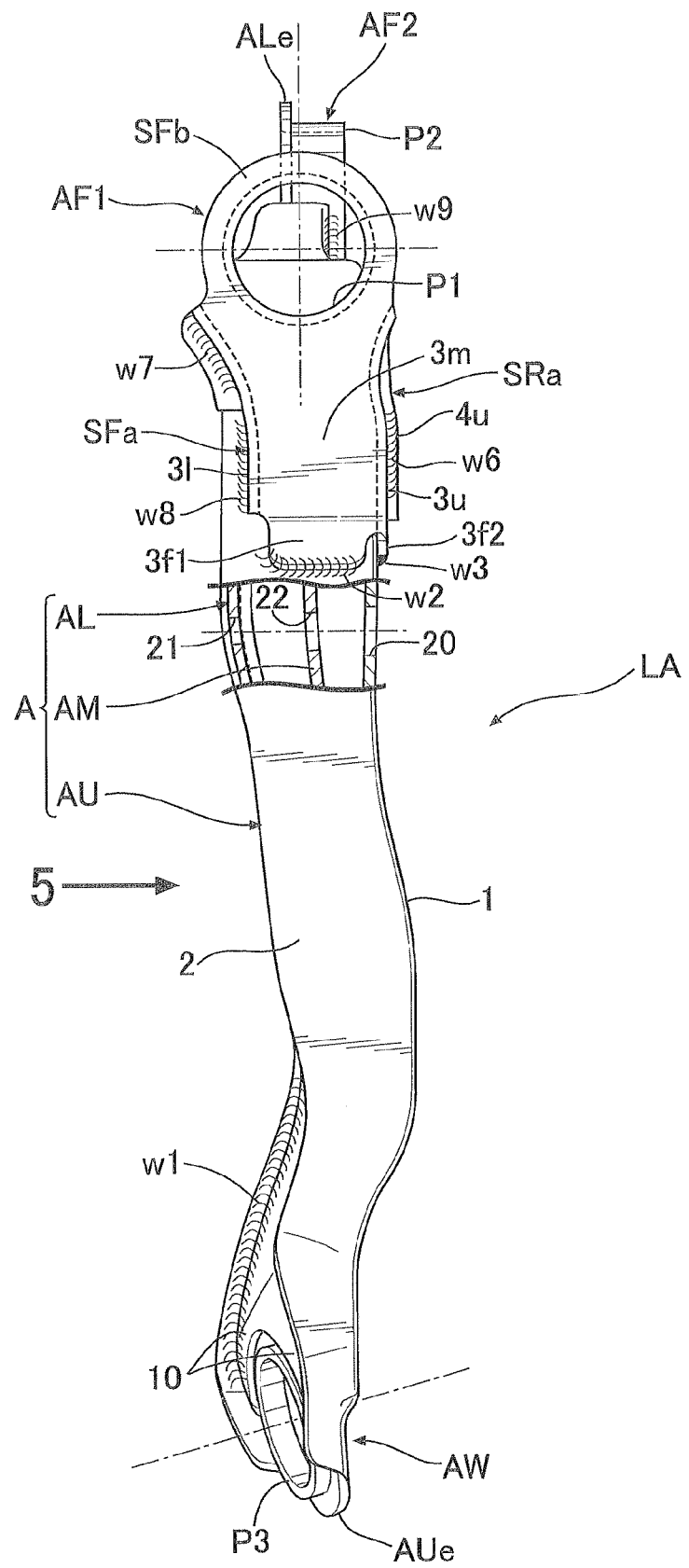
FIG. 4 is a side view of the suspension arm on its own (view from arrow 4 in FIG. 3).
Figure 5:
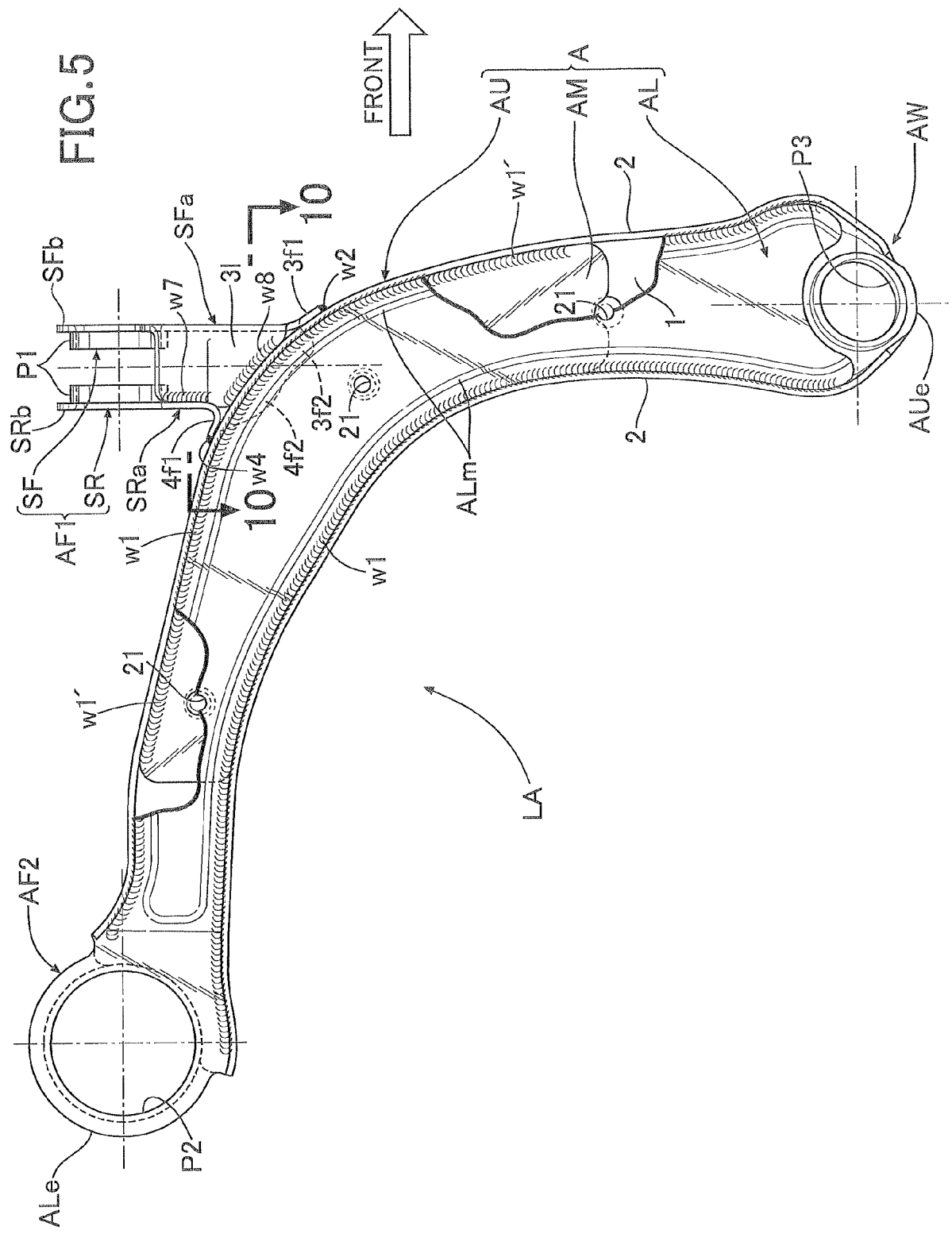
FIG. 5 is a bottom view of the suspension arm on its own (view from arrow 5 in FIG. 4).
Figure 6:
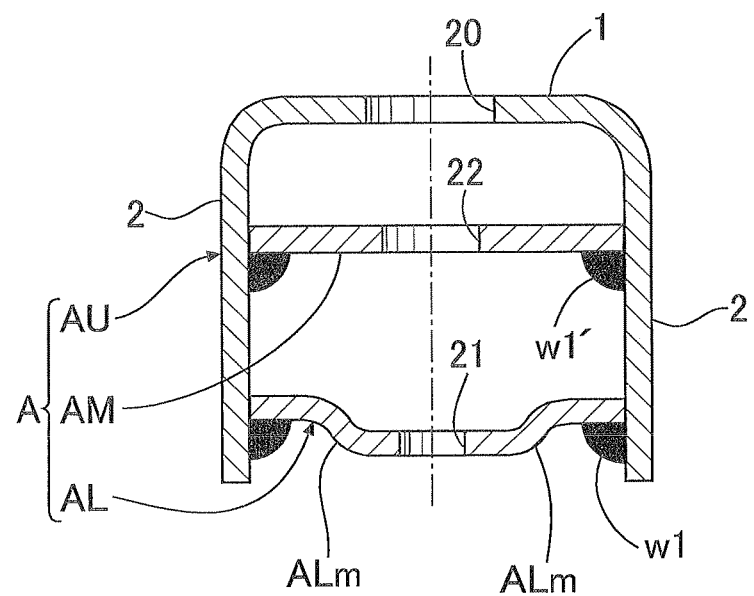
FIG. 6 is an enlarged sectional view along line 6-6 in FIG. 3.
Figure 7:
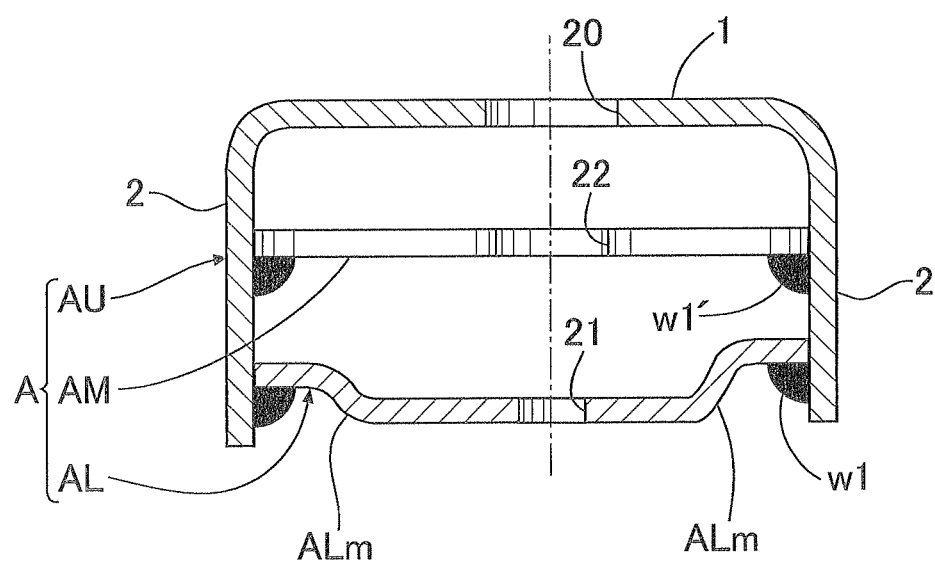
FIG. 7 is an enlarged sectional view along line 7-7 in FIG. 3.
Figure 8:
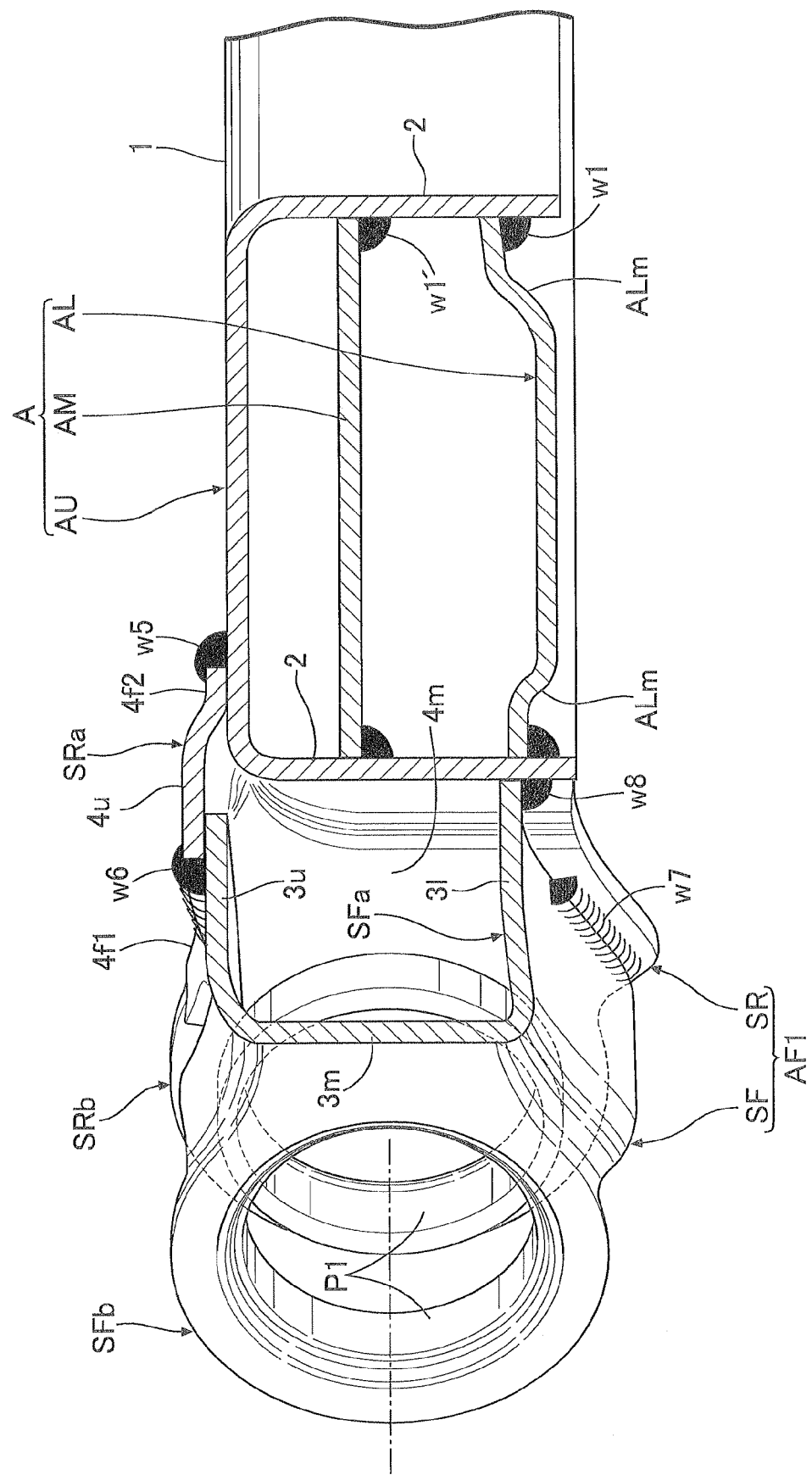
FIG. 8 is an enlarged sectional view along line 8-8 in FIG. 3.
Figure 9:
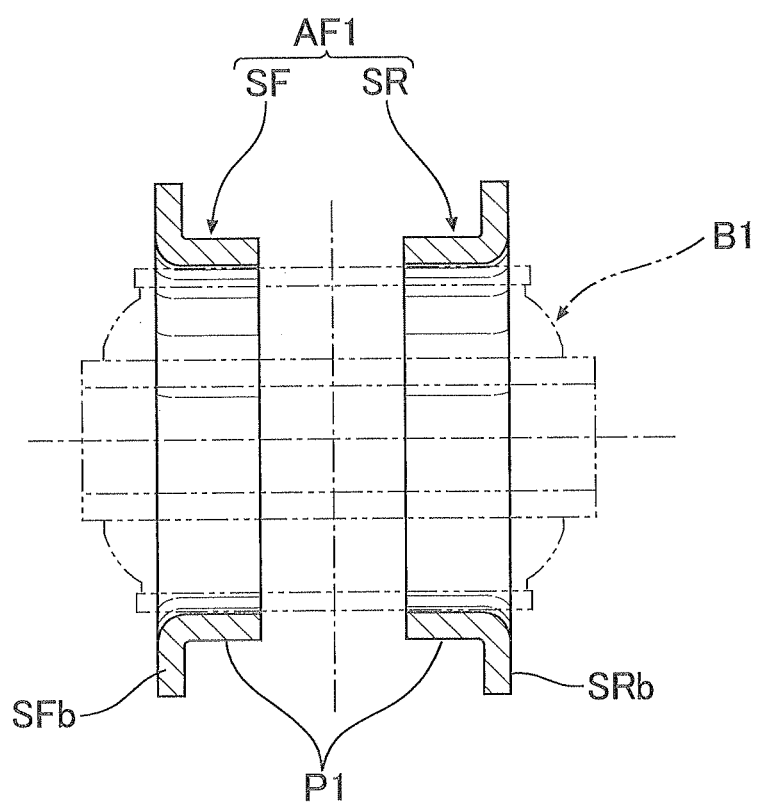
FIG. 9 is a transverse sectional view of an essential part of a first bush support part (enlarged sectional view along line 9-9 in FIG. 3).

First, in FIG. 1, a lower part of a wheel support member N such as a knuckle that rotatably supports a wheel and an upper part of the wheel support member N are vertically movably supported on the vehicle body or a sub-frame linked thereto (hereinafter, simply called a vehicle body F) by a lower arm LA and an upper arm (not illustrated) respectively. The lower arm LA is a so-called L-type arm and forms an arm member of the present invention.

An arm main body A of the lower arm LA has a substantially 'dogleg'-shaped or 'L'-shaped form in plan view, and a wheel support part AW is provided on one end part thereof, the wheel support part AW being swivelably linked to the wheel support member N via a ball joint BJ. Furthermore, a first vehicle body side linking portion AF1 is provided in a bent intermediate part of the arm main body A, the first vehicle body side linking portion AF1 being able to be swingably linked to the vehicle body F via a first linking pin J1 and a first bush B1 disposed with their axes in the vehicle body fore-and-aft direction and, furthermore, a second vehicle body side linking portion AF2 is provided on the other end part, that is, a rear end part in the vehicle body fore-and-aft direction, of the arm main body A, the second vehicle body side linking portion AF2 being able to be swingably linked to the vehicle body F via a second linking pin J2 and a second bush B2 disposed with their axes in the vertical direction.

One example of the structure of the lower arm LA is now specifically explained by reference in addition to FIG. 2 to FIG. 13. First, in FIG. 2 to FIG. 7, the arm main body A has a closed cross-sectional hollow structure in which an upper half body AU and a lower half body AL are integrally joined to each other, the upper half body AU and the lower half body AL each being formed by press forming a steel sheet, and the upper half body AU is formed with an inverted U-shaped cross-section while having an upper wall part 1 and a pair of side wall parts 2 extending downward from opposite sides in the width direction of the upper wall part 1.

Furthermore, the lower half body AL is basically formed in a flat plate shape and has a substantially 'dogleg'-shaped or 'L'-shaped form in plan view so as to block the lower open end of the upper half body AU. End faces on opposite sides in the width direction of the lower half body AL are butt-welded by welds w1 to inner faces of the pair of side wall parts 2 of the upper half body AU. Curved parts ALm are formed on the lower half body AL along the longitudinal direction of the lower half body AL when press forming the lower half body AL, the curved parts ALm providing a smooth connection between an intermediate part in the width direction of the lower half body AL and end parts on opposite sides in the width direction that are at a higher position than the intermediate part (that is, the inner side of the upper half body AU).

As described above, by making the lower half body AL have a basically flat plate shape, since the step of press processing a main body portion of the lower half body AL can be simplified as much as possible, processing can be done using a progressive die, thus saving processing cost and improving the work efficiency. Moreover, due to the curved part ALm being specially provided, the end faces on opposite sides of the lower half body AL can be spaced upward considerably from the lower open end of the upper half body AU while ensuring a sufficient cross-sectional height for the arm main body A, and it is therefore possible to ensure a sufficient welding allowance between the end faces on opposite sides of the lower half body AL and the inner faces of the side wall parts 2 of the upper half body AU, thus enhancing the weld strength.

Furthermore, a reinforcing plate AM is housed within the upper half body AU, the reinforcing plate AM dividing the inner space thereof into upper and lower parts, and the end faces on opposite sides of the reinforcing plate AM are each butt-welded by welds w1' to the opposing inner faces of the opposite side wall parts 2 of the upper half body AU. This reinforcing plate AM is added as desired, and the number thereof installed may be increased or t may be dispensed with as appropriate according to the strength required for the arm main body A.

In addition, each of the upper half body AU, the lower half body AL, and the reinforcing plate AM has at least one small hole 20, 21, 22 formed so as to extend therethrough with the small holes 20, 21, and 22 at positions corresponding to each other, the small holes 20, 21, and 22 allowing paint to flow through in a step of painting the arm main body A.

The structure of the first vehicle body side linking portion AF1 is now explained by referring in addition to FIG. 8 to FIG. 11. This first vehicle body side linking portion AF1 is formed from a double support plate assembly having a joined two-piece structure in which front and rear support plates SF and SR are each formed by press forming a steel plate and are arranged in the vehicle body fore-and-aft direction. With regard to the front and rear support plates SF and SR, base parts SFa and SRa thereof are welded to each other, and base ends thereof are welded to an outer face of an intermediate part of the arm main body A (only the upper half body AU in the illustrated example).

Extremity parts SFb and SRb of the front and rear support plates SF and SR are arranged in the vehicle body fore-and-aft direction with a space interposed therebetween, and cylindrical first bush support parts P1 and P1 are formed on the same axis integrally with the extremity parts SFb and SRb by burring, an outer tubular part of the first bush B1 being pressfitted into the first bush support parts P1 and P1.

Joining flange parts 3/1, 3/2, 4/1, and 412 are integrally provided with at least one part of the base end of each of the front and rear support plates SF and SR at the same time as press processing the front and rear support plates SF and SR, the joining flange parts 3/1, 3/2, 4/1, and 412 being in surface contact with and welded by welds w2, w3, w4, and w5 to the outside face (that is, the outer face of the side wall part 2) and the upper face (that is, the outer face of the upper wall part 1) of the upper half body AU.

The front and rear support plates SF and SR are each formed by press forming with a direction in which they move closer to each other along the vehicle body fore-and-aft direction as the press direction; by this press forming a linking arm part is formed integrally with at least one side edge part of the base part SFa, SRa of at least one of the support plates SF and SR, the linking arm extending toward the other support plate SR, SF, and by welding between the linking arms or between the linking arm part and the other support plate the front and rear support plates SF and SR are joined. That is, in the illustrated example, a pair of upper and lower linking arm parts 3u and 31 extending toward the rear support plate SR are formed integrally with upper and lower opposite edge parts of a main body part 3m of the base part SFa of the front support plate SF, whereas an upper linking arm 4u extending toward the front support plate SF is formed integrally with an upper edge part of a main body part 4m of the base part SRa of the rear support plate SR. Extremity parts of the front and rear upper linking arms 3u and 4u are superimposed on one another, brought into surface contact, and welded by a weld w6, an extremity face of the front lower linking arm part 31 is butt-welded by a weld w7 to an inner face of the main body part 4m of the base part SRa of the rear support plate SR, and a side end face of the front lower linking arm part 31 is butt-welded by a weld w8 to the outside face of the upper half body AU.

In accordance with such a mode of pressing the front and rear support plates SF and SR and mode of butt-welding after pressing, it is possible to sufficiently enhance the weld strength of the support plates SF and SR while simplifying as much as possible the step in which they are pressed.

Figure 10:
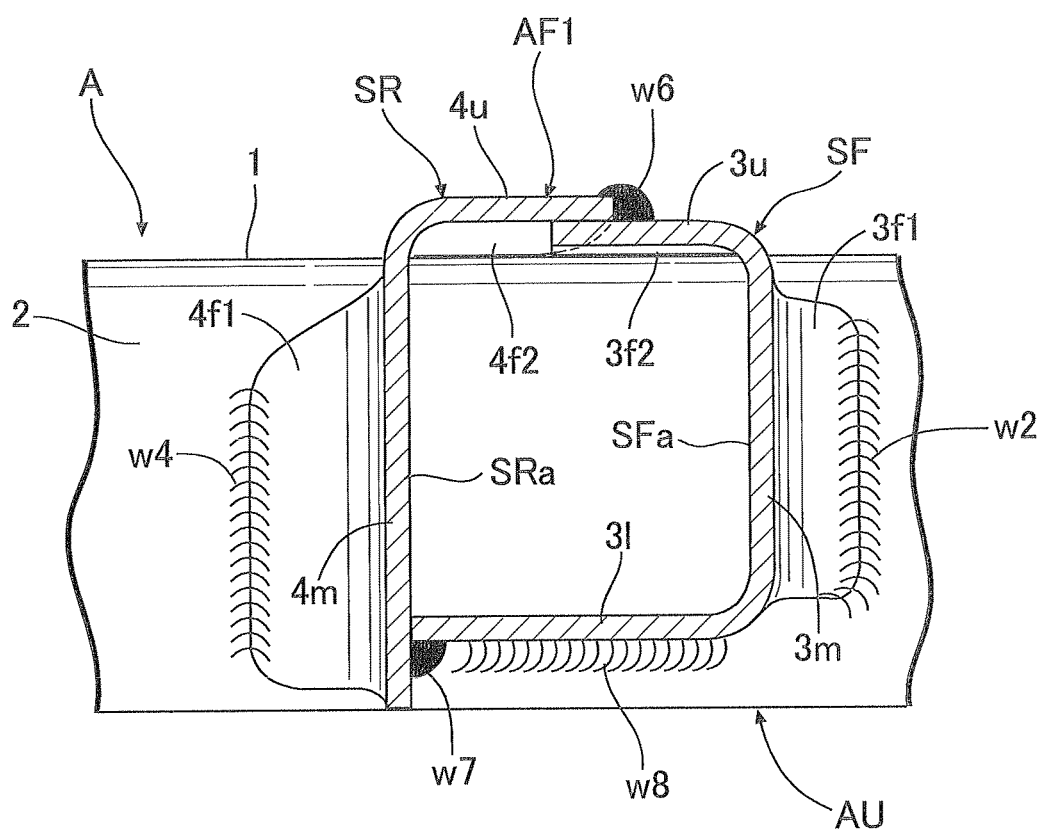
FIG. 10 is a vertical sectional view of an essential part of the first bush support part (enlarged sectional view along line 10-10 in FIG. 5).
Figure 11:
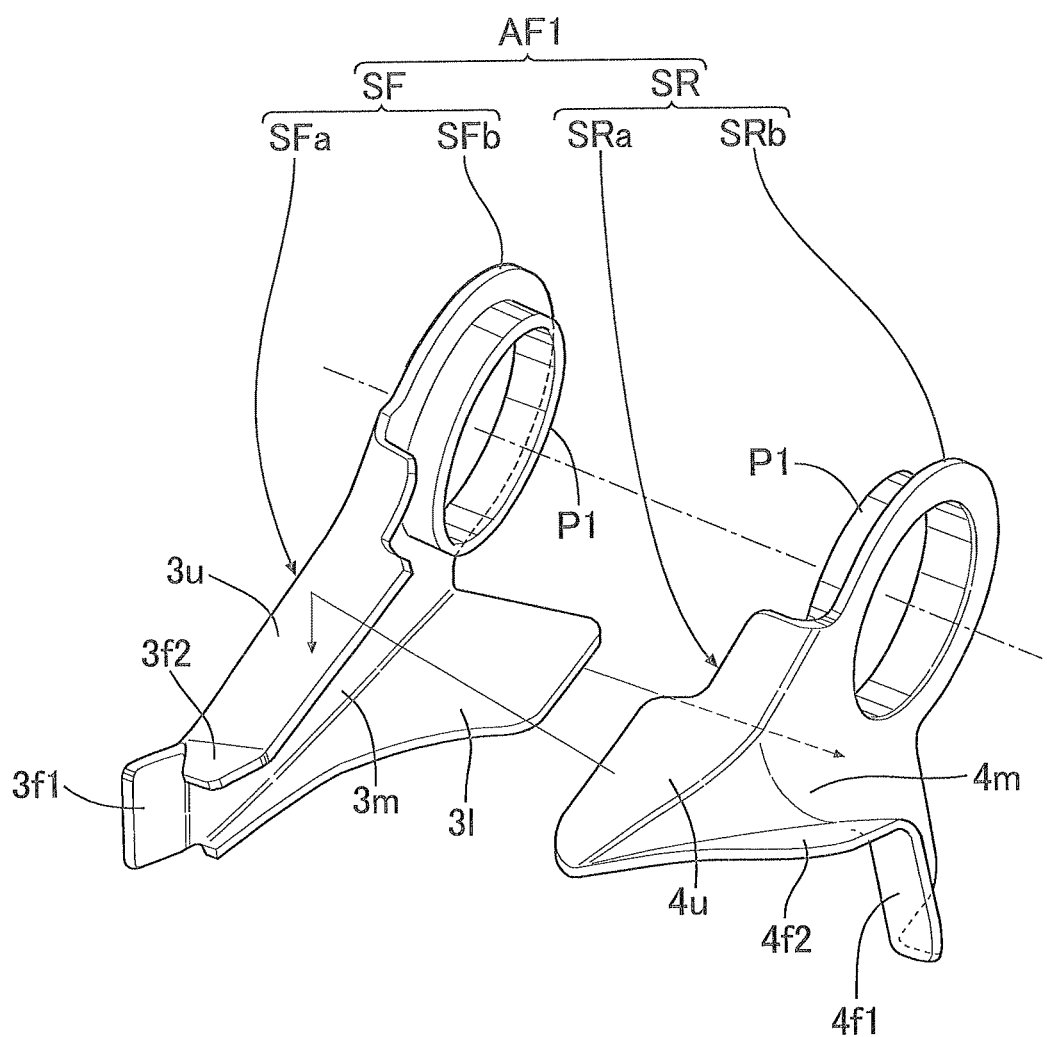
FIG. 11 is an exploded perspective view of a first vehicle body side linking portion.

With regard to the base parts SFa and SRa of the front and rear support plates SF and SR, at least one part thereof is formed in a closed cross-sectional structure as shown in FIG. 10 due to the base parts being joined (welded) to each other.

Figure 12:
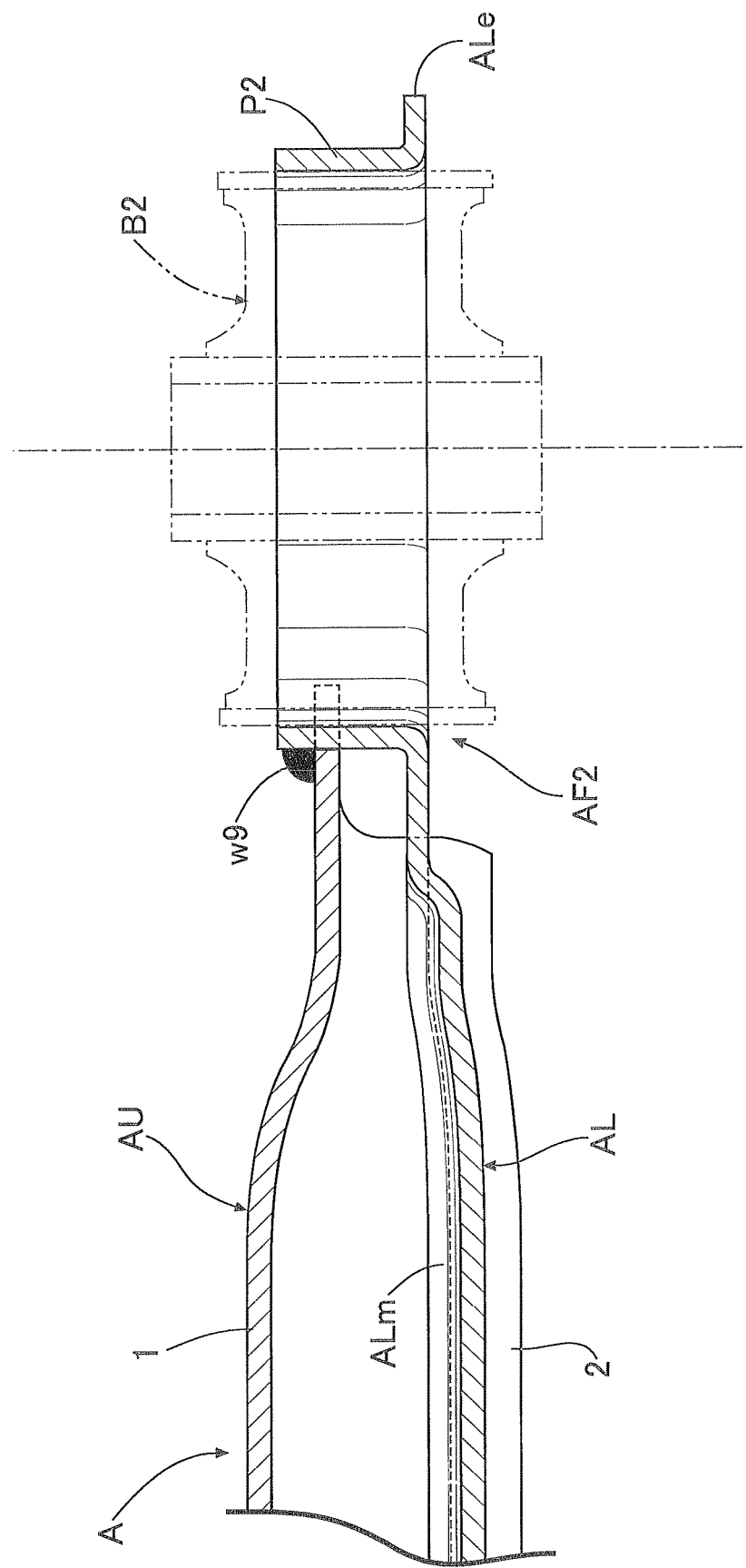
FIG. 12 is a sectional view of an essential part of a second bush support part (enlarged sectional view along line 12-12 in FIG. 3).

The structure of the second vehicle body side linking portion AF2 is now explained by referring in addition to FIG. 12. At the inner end part of the arm main body A, the lower half body AL extends a long way further outward (to the rear of the vehicle body) than the upper half body AU, and an upwardly facing cylindrical second bush support part P2 is formed integrally with the extended part ALe by burring so that the extended part is the second vehicle body side linking portion AF2, the outer tubular part of the second bush B2 being able to be press-fitted into the second bush support part P2. Since the processing height of this burring, that is, the axial dimension of the second bush support part P2, is set to be relatively small (that is, shorter than the overall axial length of the outside part of the second bush B2), forming can be carried out without undue stress, and it is therefore possible to carry out processing simultaneously with or subsequent to processing of the lower half body AL using a progressive die, thus saving cost and improving the work efficiency.

Furthermore, an outer peripheral face, close to the intermediate part of the arm main body A, of the second bush support part P2 thus burred is butt-welded by a weld w9 to the outer end face of the upper half body AU, which is formed in a corresponding arc shape in plan view. In this case, in the illustrated example, the outer peripheral face of the second bush support part P2 projects above the outer end face of the upper half body AU by a predetermined amount, and the outer peripheral face of the projecting part and the upper face of the outer end part of the upper half body AU are welded by the weld w9.

Figure 13:
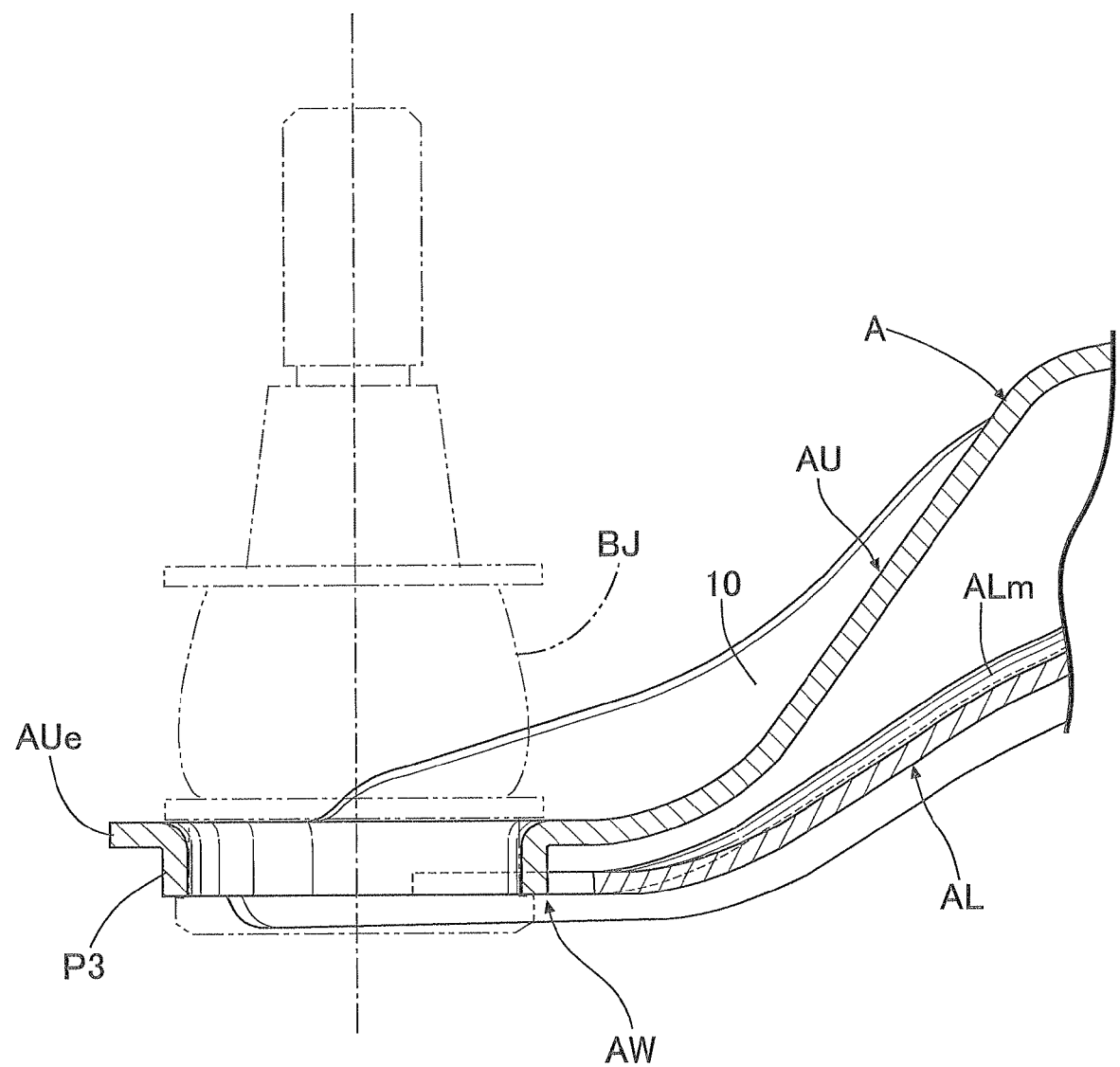
FIG. 13 is a sectional view of an essential part of a wheel support part (enlarged sectional view along line 13-13 in FIG. 3).

The structure of the wheel support part AW is now explained by referring in addition to FIG. 13. At the outer end part of the arm main body A, the upper half body AU extends a long way further outward than the lower half body AL, and an upwardly facing cylindrical ball joint support part P3 is formed integrally with the extended part AUe by burring so that the extended part is the wheel support part AW, the base end part of the ball joint BJ supporting the wheel support member N being able to be press-fitted into the ball joint support part P3. A pair of reinforcing ribs 10 are formed in a forked shape on the upper wall part 1 of the upper half body AU on opposite sides of the ball joint support part P3, thus reinforcing a section surrounding the ball joint support part P3.

The operation of the above embodiment is now explained. With regard to the arm main body A of the lower arm LA as an L-type suspension arm, the upper half body AU and the lower half body AL thereof are separately formed by press forming a plate material in advance. Furthermore, the front and rear support plates SF and SR, which form the first vehicle body side linking portion AF1, are also separately formed by press forming a plate material in advance, the base parts SFa and SRa of the two support plates SF and SR are welded to each other to thus assemble a support plate assembly, that is, the first vehicle body side linking portion AF1, and this assembly is welded to the outside face of the arm main body A (only the upper half body AU in the illustrated example).

In this way, since the first vehicle body side linking portion AF1 can be formed simply by means of the joined two-piece structure of the front and rear support plates SF and SR while ensuring a sufficient cross-section, even if a large fore-and-aft load from the wheel acts on the first vehicle body side linking portion AF1 when the vehicle is braking, accelerating, turning, etc., this can be sufficiently counteracted. Moreover, since the first vehicle body side linking portion AF1 is formed from only two press formed products, that is, the joined two-piece structure, the management of components can be simplified, and there is a large contribution to weight reduction and cost saving.

Furthermore, since the structure is such that the cylindrical first bush support parts P1 and P1 are formed on the same axis integrally with the extremity parts SFb and SRb of the front and rear support plates SF and SR by burring, the first bush support parts P1 and P1 can be integrated with the front and rear support plates SF and SR without specially welding a collar that would be a first vehicle body side linking portion as in a Conventional Example. As a result, not only is it possible to eliminate the problems of the Conventional Example caused by welding of a collar, but it is also possible to ensure a sufficient support span in the fore-and-aft direction for the first bush B1, which is fitted into and supported by the first bush support parts P1 and P1, thus stabilizing and strengthening the support by means of a simple structure.

Figure 14:
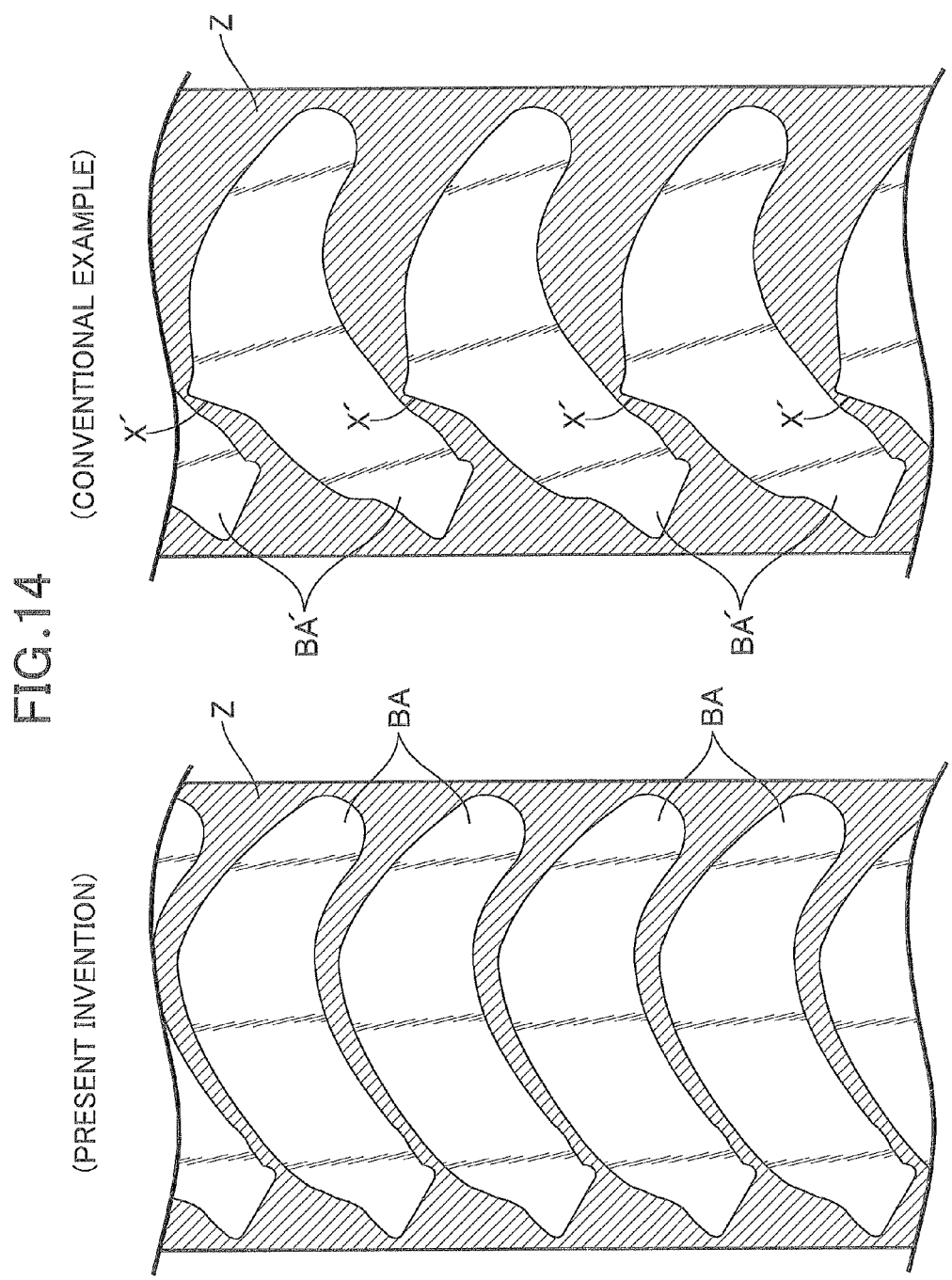
FIG. 14 is an explanatory diagram for schematically showing a mode in which scrap is generated when a blank material before press forming an arm main body is stamped from a plate material by comparing a case in accordance with the present invention and a case in accordance with a Conventional Example.

As shown in FIG. 14, in a Conventional Example in which a horn-shaped support part for supporting a collar, which is a first vehicle body side linking portion, is simultaneously press formed in a longitudinally intermediate part of an upper half body AU, it is necessary to form a horn-shaped projecting portion X' that protrudes considerably from the main line in a blank material BA' prior to press forming so as to correspond to the horn-shaped support part, and this projecting portion X' is the main cause of degradation in the efficiency with which the blank materials BA' can be arranged in a starting plate material Z (and, consequently, in the material yield) and of an increase in materials cost. In contrast, in this embodiment, since the outline of the blank material BA before press forming of the arm main body A can be formed as smoothly as possible compared with the outline of the blank material BA' of the Conventional Example, it becomes possible to enhance the efficiency with which the blank materials BA' are arranged in the starting plate material Z and improve the material yield, thus further saving cost.

Furthermore, in the illustrated example, the base parts SFa and SRa of the front and rear support plates SF and SR are welded, among the upper and lower half bodies AL of the arm main body A, only to the upper half body AU. Because of this, the face of the arm main body A on which there is a welded joint to the support plates SF and SR is the upper half body AU only, that is, is one large face, and it therefore becomes possible to carry out continuous strong welding, thus stabilizing the weld quality. Moreover, this effect becomes outstanding particularly when as in the illustrated example the downward protrusion of the lower half body AL from the lower end of the side wall part 2 of the upper half body AU is small or zero, that is, when the effective height of the side wall part 2 of the upper half body AU is large.

Furthermore, the joining flange parts 3/1, 3/2, 4/1, and 4/2, which are in surface contact with the outside face and the upper face of the upper half body AU and are welded by the welds w2, w3, w4, and w5, are integrally provided with at least one part of the base ends of the front and rear support plates SF and SR in particular. Because of this, the joining flange parts 3/1, 3/2, 4/1, and 412 can stabilize the precision of the gap between the support plates SF and SR and the outer face of the upper half body AU, thereby improving the ease of welding and further stabilizing the weld quality. Moreover, in accordance with the joining flange parts 3/1, 3/2, 4/1, and 4/2 being specially provided, since the front and rear support plates SF and SR can be welded to the outer face of the upper half body AU in a stable attitude, it becomes easy to ensure the weld strength.

Furthermore, in the illustrated example, at least one part of the base parts SFa and SRa of the front and rear support SF and SR has a closed cross-sectional structure due to them being joined to each other. Because of this, at least one part of the base parts SFa and SRa of the front and rear support plates SF and SR has a tubular cross-section, and the rigidity and strength of the base parts SFa and SRa of the support plates, which are formed from a plate material, can be enhanced, thus correspondingly increasing the rigidity with which the first bush B1 is supported (rigidity of linking to the vehicle body F).

With regard to the other end part of the arm main body A, that is, the rear end part, the lower half body AL extends a long way further outward than the upper half body AU, and the upwardly facing cylindrical second bush support part P2 is formed integrally with the extended part ALe by burring so that the extended part is the second vehicle body side linking portion AF2, the second bush support part P2 being capable of fitting onto and supporting the outer tubular part of the second bush B2. Because of this, the second vehicle body side linking portion AF2, which bears a relatively small load (that is, mainly bears impact load) compared with the first vehicle body side linking portion AF1, which mainly bears a load in the fore-and-aft direction when the vehicle is traveling, can be obtained by a simple structure in which the extended part of the lower half body AL is merely subjected to burring, thus saving processing cost and improving the work efficiency.

Furthermore, the outer peripheral face, close to the intermediate part of the arm main body A, of the second bush support part P2, which is formed by burring, is butt-welded by the weld w9 to the outer end face of the upper half body AU, which is formed in an arc shape in plan view so as to correspond thereto, the second bush support part P2, which is integral with the lower half body AL, and the upper half body AU are joined and integrated, thus enabling the rigidity with which the second bush B2 is supported by the bush support part P2 (that is, the rigidity of linking to the vehicle body F) to be sufficiently enhanced. In this case, a large reaction force transmitted from the second bush B2 to the second bush support part P2 can be held by the upper half body AU and the lower half body AL in a doubly supported state, thus providing a bush retaining structure having strength and durability.

Moreover, in the illustrated example, the outer peripheral face of the second bush support part P2 projects further upward than the arc-shaped outer end face of the upper half body AU by a predetermined amount, and the outer peripheral face of the projecting part and the upper face of the outer end part of the upper half body AU are welded by the weld w9 via a predetermined area in the peripheral direction of the bush support part P2. Because of this, it becomes possible to ensure sufficient welding allowance between the outer peripheral face of the second bush support part P2 and the upper face of the outer end part of the upper half body AU both in the peripheral direction and the height direction of the bush support part P2, thus enhancing the weld strength.

Figure 15:
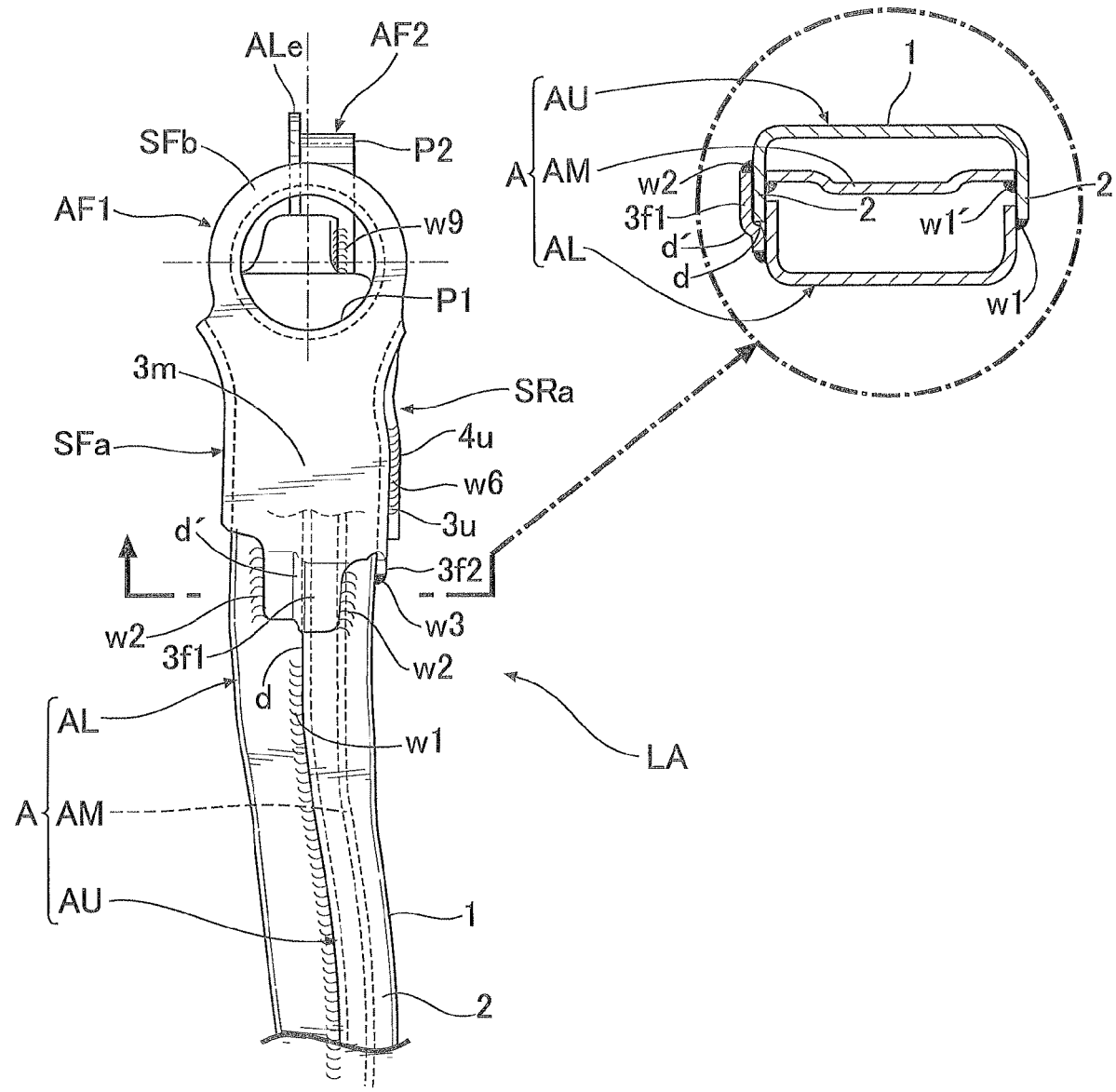
FIG. 15 is a view, corresponding to FIG. 4, showing another embodiment of the present invention and a partial enlarged sectional view.

Furthermore, FIG. 15 shows an essential part of another embodiment of the present invention. In this embodiment, a lower part of a lower half body AL that is press formed so as to have a U-shaped cross-section protrudes a long way further downward than the lower end of a side wall part 2 of an upper half body AU having an inverted U-shaped cross-section, thus forming a step d on an outside face of a part where the upper and lower half bodies AU and AL are joined. A step d' corresponding to the step d of an arm main body A is formed simultaneously on joining flange parts 3/1 and 4/1 of front and rear support plates SF and SR, which become a first vehicle body side linking portion AF1, when press forming the support plates SF and SR. Furthermore, welds w2 and w4 between the joining flange parts 3/1 and 4/1 and the arm main body A (upper and lower half bodies AU and AL) are made at edges, along the longitudinal direction of the arm main body A, of the joining flange part 3/1 and 4/1 as shown in FIG. 15. A weld w1 between the upper and lower half bodies AU and AL can be omitted in order to save cost as in the illustrated example in a predetermined area corresponding to the joining flange parts 3/1 and 4/1, but the weld w1 may also be present in the predetermined area.

In this embodiment, since step processing of the joining flange parts 3/1 and 4/1 can be carried out easily, precisely, and reliably by pressing of the front and rear support plates SF and SR with a direction along the vehicle body fore-and-aft direction as the press direction as described above, it is possible to stably ensure the join quality of the weld between the upper and lower half bodies AU and AL and the joining flanges 3/1 and 4/1.

Embodiments of the present invention are explained above in detail, but the present invention is not limited to the above embodiments and a variety of small design modifications may be carried out.

For example, in this embodiment, the vehicular suspension arm of the present invention may be applied to either a front wheel or a rear wheel.

Furthermore, the above embodiments show an arrangement in which the ball joint support part P3 is formed by burring of the upper half body AU in the wheel support part AW on one end part of the arm main body A, but in the present invention a ball joint support part that is prepared separately from an arm main body A may be subsequently joined to the arm main body.

The invention claimed is:

1. A vehicular L-shape suspension arm in which a wheel support part (AW) that is capable of supporting a wheel is provided on one end part of an arm main body (A) that is L-shaped in plan view, a first vehicle body side linking portion (AF1) that is capable of being swingably linked to a vehicle body (F) via a first bush (B1) arranged with an axis thereof lying in a fore-and-aft direction of the vehicle body is provided in an intermediate part of the arm main body (A), and a second vehicle body side linking portion (AF2) that is capable of being swingably linked to the vehicle body (F) via a second bush (B2) arranged with an axis thereof lying in an up-and-down direction is provided on the other end part of the arm main body (A), characterized in that the arm main body (A) comprises an upper half body (AU) formed with an inverted U-shaped cross-section while having an upper wall part (1) and a pair of side wall parts (2) extending downward from opposite sides of the upper wall part (1), and a lower half body (AL) that is formed by press forming a plate material in a shape so as to block a lower open end of the upper half body (AU) and is welded by welds (w1) to inner faces of the pair of side wall parts (2) of the upper half body (AU), at the other end part of the arm main body (A) the lower half body (AL) extends lengthwise further outward than the upper half body (AU) so as to form an extended part (ALe), an upwardly facing cylindrical bush support part (P2) is formed by burring integrally with the extended part (ALe) so that the extended part (ALe) is the second vehicle body side connecting portion (AF2), the bush support part (P2) being capable of fitting onto and supporting an outer tubular part of the second bush (B2), and the bush support part having an outer peripheral face, wherein a portion of the outer peripheral surface closest to the intermediate part of the arm main body (A) is butt-welded by a weld (w9) to an outer end face of the upper half body (AU).

2. The vehicular L-shape suspension arm according to claim 1, wherein the lower half body (AL) is formed in a flat plate shape, and end faces on opposite sides thereof are butt-welded by welds (w1) to the inner faces of the pair of side wall parts (2) of the upper half body (AU).

3. The vehicular L-shape suspension arm according to claim 1 or 2, wherein an upper end part of the bush support part (P2) projects further upward than an upper face of an outer end part of the upper half body (AU), and an outer peripheral face of the projecting part and the upper face of the outer end part of the upper half body (AU) are welded by a weld (w9).

4. The vehicular L-shape suspension arm according to claim 2, wherein a curved part (ALm) is formed on the lower half body (AL) along the longitudinal direction of the lower half body (AL) when press forming the lower half body (AL), the curved part (ALm) providing a connection between an intermediate part in the width direction of the lower half body (AL) and end parts on opposite sides in the width direction that are at a higher position than the intermediate part.

* * * * *